(12) United States Patent
Schwager

(10) Patent No.: US 8,761,272 B2
(45) Date of Patent: Jun. 24, 2014

(54) SYSTEM AND COMMUNICATIONS DEVICE FOR TRANSMITTING DATA VIA A POWERLINE AND CORRESPONDING METHOD

(75) Inventor: Andreas Schwager, Stuttgart (DE)

(73) Assignee: Sony Corporation, Minato-ku (JP)

( * ) Notice: Subject to any disclaimer, the term of this patent is extended or adjusted under 35 U.S.C. 154(b) by 0 days.

(21) Appl. No.: 13/997,478

(22) PCT Filed: Nov. 7, 2011

(86) PCT No.: PCT/EP2011/005587
§ 371 (c)(1),
(2), (4) Date: Jun. 24, 2013

(87) PCT Pub. No.: WO2012/095122
PCT Pub. Date: Jul. 19, 2012

(65) Prior Publication Data
US 2013/0279610 A1    Oct. 24, 2013

(30) Foreign Application Priority Data

Jan. 10, 2011 (EP) .................................... 11000118

(51) Int. Cl.
*H04L 25/02* (2006.01)
(52) U.S. Cl.
USPC ............................ 375/257; 370/203; 375/259
(58) Field of Classification Search
USPC ................... 375/257, 259, 260; 370/241, 203
See application file for complete search history.

(56) References Cited

U.S. PATENT DOCUMENTS

| 4,227,250 | A | * | 10/1980 | Wyner | 375/259 |
|---|---|---|---|---|---|
| 6,115,354 | A | * | 9/2000 | Weck | 370/203 |
| 7,366,088 | B2 | * | 4/2008 | Bolinth et al. | 370/203 |
| 2002/0186714 | A1 | * | 12/2002 | Mestdagh | 370/480 |
| 2004/0022175 | A1 | * | 2/2004 | Bolinth et al. | 370/203 |
| 2004/0160990 | A1 | * | 8/2004 | Logvinov et al. | 370/509 |
| 2006/0256883 | A1 | * | 11/2006 | Yonge et al. | 375/260 |
| 2011/0267956 | A1 | * | 11/2011 | Yonge et al. | 370/241 |

OTHER PUBLICATIONS

Schwager, A., "Powerline Communications: Significant Technologies to become Ready for Integration," Dissertation, Total pp. 177, (2010).
International Search Report Issued Feb. 2, 2012 in PCT/EP11/05587 Filed Nov. 7, 2011.

* cited by examiner

*Primary Examiner* — Daniel Washburn
*Assistant Examiner* — Berhanu Tadese
(74) *Attorney, Agent, or Firm* — Oblon, Spivak, McClelland, Maier & Neustadt, L.L.P.

(57) ABSTRACT

A system for transmitting data via a power line including: a first communications device and a second communications device, the first communications device including a transmit unit adapted to generate OFDM symbols to be transmitted using sub-carriers; a roll-off interval indication unit adapted to generate a transmit message indicating that no roll-off interval before and/or after the OFDM symbols is used when transmitting the data; the transmit unit being further adapted to transmit the transmit message; the second communications device including a receive unit adapted to generate the data from the transmitted OFDM symbols by taking into account the received transmit message.

15 Claims, 5 Drawing Sheets

US 8,761,272 B2

SYSTEM AND COMMUNICATIONS DEVICE FOR TRANSMITTING DATA VIA A POWERLINE AND CORRESPONDING METHOD

CROSS-REFERENCE TO RELATED APPLICATIONS

The present application claims priority of EP patent application No. 11 000 118.7 filed on Jan. 10, 2011, the entire contents of which are incorporated herein by reference.

The disclosure relates to a system and a communications device for transmitting data via a powerline and a corresponding method.

BACKGROUND

In powerline communication orthogonal frequency division multiplexing (OFDM) is used for transmitting data from a first communications device, e.g. a transmitter to a second communications device, e.g. a receiver. OFDM distributes data over a large number of orthogonal sub-carriers. The orthogonality of the sub-carriers allows a per-carrier demodulation at the receiver side, since at the receiver side the demodulators are prevented from considering other sub-carriers than that one there are dedicated to. OFDM provides high spectral efficiency and allows sub-carrier selection and modulation to be adapted to the transmission channel characteristics.

SUMMARY

It is an object of the disclosure to provide a system, a communications device with enhanced transmission performance and a method for transmitting data via a powerline, which provides enhanced transmission performance in a communication system.

The object is achieved by the subject-matters of the independent claims. Further embodiments are specified in the dependent claims, respectively. Details of the disclosure will become more apparent from the following description of embodiments in connection with the accompanying drawings, wherein features of the various embodiments may be combined unless they exclude each other.

DETAILED DESCRIPTION

Figure 1:
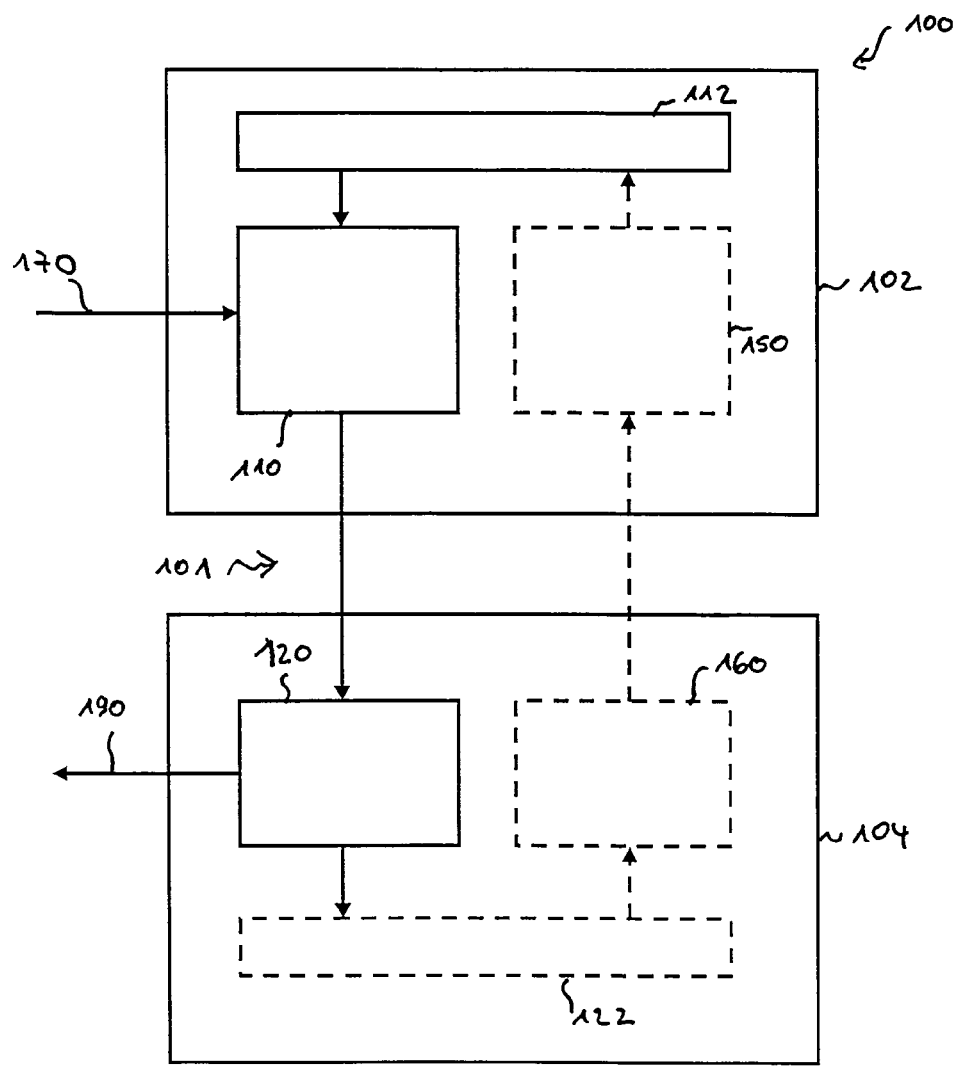
FIG. 1 shows a schematic block diagram of a system according to an embodiment of the disclosure.

In FIG. 1 a schematic block diagram of a system 100 for transmitting data via a powerline is depicted.

The system 100 is based on an OFDM modulation scheme. For example, the system 100 is a power line communications (PLC), mains communications, power line telecommunications (PLT), broadband power line (BPL) or power band or power line networking (PLN) system using modulated carriers superimposed to the power line alternating current, which may have a frequency of 50 or 60 Hz, by way of example.

The system 100 comprises a first communications device 102 including a transmit unit 110 and a second communications device 104 including a receive unit 120.

The first communications device 102 and the second communications device 104 might also be referred to as "modems", "PLC modems (powerline communications modems", "nodes" or "PLC nodes (powerline communications nodes)".

The system 100 may be a SISO (single-input-single-output) or a MIMO (multiple-input-multiple-output) system. A transmission channel 101 connects the transmit unit 110 and the receive unit 120.

The first communications device 102 may be an exclusively transmitting device with one or a plurality of transmit ports only. According to other embodiments, the first communication device 102 is a bidirectional device including, in addition to the transmit unit 110, a receive unit 150 which may be of the type of a receive unit 120 in the second communications device 104. The second communications device 104 may be an exclusively receiving device. According to other embodiments, the second communications device 104 is a bidirectional device including, in addition to the receive unit 120, a transmit unit 160 which may be of the type of the transmit unit 110 in the first communications device 102. The communications devices 102, 104 may be stand-alone devices or may be integrated in an electronic device for consumer applications, for example a storage unit, a television set, an audio receiver, or a video recorder.

The transmit unit 110 is adapted to generate OFDM symbols to be transmitted using sub-carriers by transforming incoming data 170.

The first communications device 102 further includes a roll-off interval indication unit 112 adapted to generate a transmit message indicating that no roll-off interval before and/or after the OFDM symbols is used when transmitting the data.

The transmit unit 110 is further adapted to transmit the transmit message to the receive unit 120 of the second communications device 104.

The receive unit 120 is adapted to generate outgoing data 190, which is intended to correspond to the incoming data 170, from the transmitted OFDM symbols by taking into account the received transmit message.

The second communications device 104 might further include a roll-off interval handling unit 122 adapted to generate a receive message indicating that the receive unit 120 is able to handle OFDM symbols without roll-off interval before and/or after the OFDM symbols. In this embodiment the further transmit unit 160 is adapted to transmit the receive message to the receive unit 150 of the first communications device 102.

The transmit message might also be referred to as transmit information, transmit flag or transmit bit(s). Since the message conveys the information whether a roll-off interval is used or not, a single bit for the transmit message can be used, using only a limited amount of further communications resources.

Figure 2:
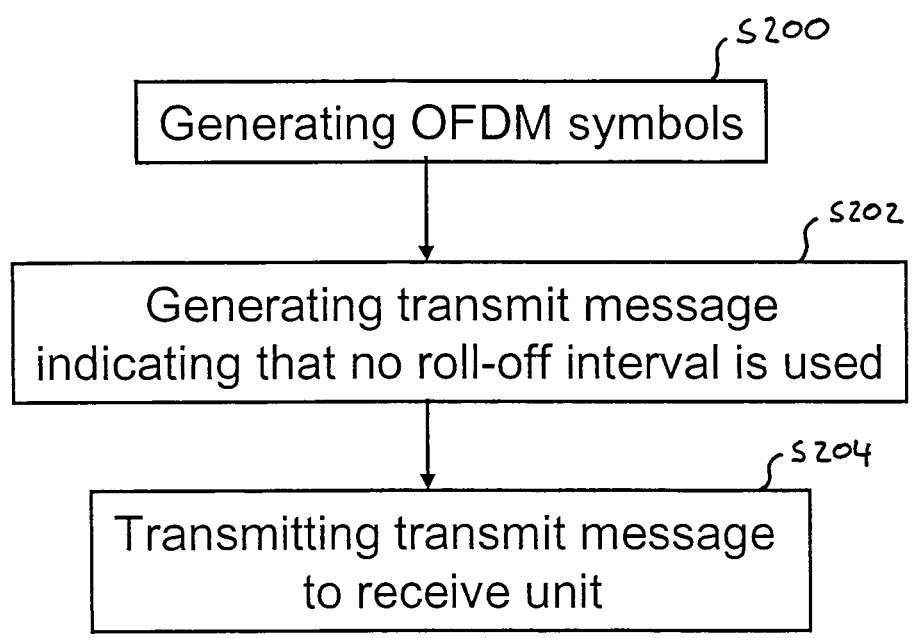
FIG. 2 shows schematically steps of a method according to an embodiment of the disclosure.

In FIG. 2 method steps of a corresponding method are depicted. In a step S200 OFDM symbols are generated. A transmit message indicating that no roll-off interval is used is generated in S202. The transmit message is transmitted to the receive unit 120 in step S204.

Figure 3:
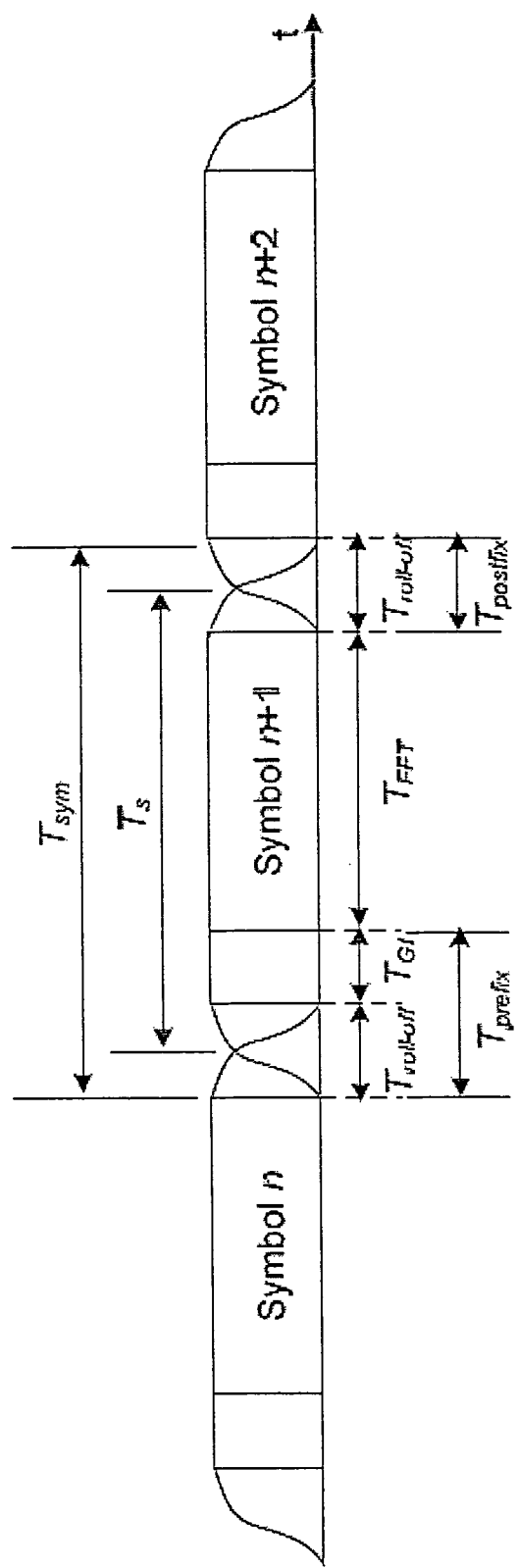
FIG. 3 shows a schematic time diagram of consecutive OFDM symbols, guard intervals and roll-off intervals.

As depicted in FIG. 3 in today's powerline modems a roll-off interval $T_{roll-off}$ is frequently used as a method to shape OFDM spectra. A roll-off interval is added to the symbol time even if this causes a loss of communication resources in time domain. A frequency range of conventional powerline transmission (PLT) modems (2 MHz to 30 MHz) overlaps with frequency ranges of HF (high frequency) radio services. Powerline wires in private homes are not shielded and due to branches, distribution boxes etc. the powerline network is structured with a certain amount of asymmetry. The asymmetries of the powerline network convert the differentially set signals into common mode signals, which tend to interfere with radio devices. If e.g. a short wave (SW) radio receiver (AM (amplitude modulation) or DRM (digital radio mondiale)) is operated indoors where a powerline communication is active, the radio reception quality might suffer. When the radio device is connected to the mains power supply and the radio has an insufficient decoupling at its mains port, the conducted path is especially dominant in terms of interference. Therefore, the coexistence between powerline transmission and HF radio reception is very important. In order to ensure coexistence of powerline transmission and HF radio services it is envisaged to notch the HF radio bands either statically or dynamically from the spectrum that is used by powerline transmission. Today's powerline communication modems have weak notching capabilities. Notches are implemented by just omitting sub-carriers of the OFDM spectrum without any additional filters. To guarantee notches of a depth of 30 dB in the desired frequency band additional guard carriers on the left and right side of the notch must be omitted. Future norms (e.g. CENELEC TC210) will request more notches. Some of the new notches are quite small. Additional loss of resources will be caused due to the guard carriers adjacent to the multiple notches.

Today e.g. a Homeplug powerline communication modem removes usually four guard carriers on the left and right side of the notch. The Homeplug AV 1.1 specification, which was introduced in August 2005, provides sufficient bandwidth for applications such as HDTV and VoIP. It is also possible to only remove three carriers. In today's Homeplug specification eight notches are listed. Probably the next version of a European EMI norm from CENELEC TC210 requests eighteen permanent notches plus any number of dynamic notches to protect HF radio broadcast. In average ten dynamic notches might be expected. Using today's implementation of notches up to 4×2 (18+10)=224 guard carriers are needed. The current standard "Homeplug" uses a carrier spacing of $1/T_{symbol}=1/40.96 \mu s=24.414$ kHz. If up to 224 guard carriers are used 224×24,414 kHz=5.469 MHz are wasted due to the notching practice.

The process of shaping the slopes at the beginning and the end of a symbol is also known under the term "windowing". The more smoothly signals approach zero in the time domain, the deeper the notches are in the frequency domain. As shown in FIG. 3 the two descending slopes in the time domain could overlap in order to save communication resources at consecutive OFDM symbols. The guard interval $T_{GI}$ and the descending slopes $T_{roll-off}$ are added before the fast Fourier transformation (FFT) section $T_{FFT}$. The overhead caused by the additional window is called $T_{prefix}$, when the guard interval GI is included and either $T_{postfix}$ or $T_{roll-off}$ when the guard interval GI is excluded. The new symbol time $T_S$ is measured between the middles of the roll-off intervals before and after the symbol.

However, when notches are implemented using digital filtering deep slopes of the notches and deep notches can be realized. Then, the pulse shaping in time domain can be avoided.

In order to improve the interoperability between the first communications device 102 and the second communications device 104 the missing roll-off interval is signaled with the transmit message from the first communications device 102 to the second communications device 104.

Such a signaling may be realized by transmitting the transmit message in a field in the sound MPDU (Medium Access Control Physical Data Unit) variant field, e.g. by a single bit, which is used in a channel estimation process between two communication devices. The Medium Access Control Physical Data Unit (MPDU) is a unit of data exchange between two peers MAC entities using the services of a physical layer.

TABLE 1

Bit allocation for Sound MPDU Variant Field
Sound MPDU Variant Field

| Field | Octet Number | Bit Number | Field Size (Bits) | Definition |
|---|---|---|---|---|
| DT_AV | 0 | 0-2 | 3 | 0b100 (Delimiter Type) |
| ACCESS | | 3 | 1 | Access Field |
| SNID | | 4-7 | 4 | Short Network Identifier |
| STEI | 1 | 0-7 | 8 | Source Terminal Equipment Identifier |
| DTEI | 2 | 0-7 | 8 | Destination Terminal Equipment Identifier |
| LID | 3 | 0-7 | 8 | Link Identifier |
| CFS | 4 | 0 | 1 | Contention-Free Session |
| PBSz | | 1 | 1 | PHY Block Size |
| BDF | | 2 | 1 | Beacon Detect Flag |
| SAF | | 3 | 1 | Sound ACK Flag |
| SCF | | 4 | 1 | Sound Complete Flag |
| REQ_TM | | 5-7 | 3 | Max Tone Maps Requested |
| FL_AV | 5 | 0-7 | 12 | HomePlug Av Frame Length |
| | 6 | 0-3 | | |
| MPDUCnt | | 4-5 | 2 | MPDU Count |
| NO_ROI | | 6 | 1 | No Rolloff Interval |
| RSVD | | 7 | 1 | Reserved |
| PPB | 7 | 0-7 | 8 | Pending PHY Blocks |
| SRC | 8 | 0-7 | 8 | Sound Reason Code |
| RSVD | 9 | 0-7 | | Reserved |
| | 10 | 0-7 | | |
| | 11 | 0-7 | | |
| | 12 | 0-7 | | |
| FCCS_AV | 13 | 0-7 | 24 | Frame Control Check Sequence |
| | 14 | 0-7 | | |
| | 15 | 0-7 | | |

If the bit "no roll-off interval" ("NO_ROI") is set, the data communication between the two communication devices or nodes will not include time domain pulse shaping. The message or flag "no roll-off interval" indicates that there will be no pulse shaping in the time domain in-between the dataflow. By setting this bit to "1" the first communications device 102 indicates that it guarantees notch characteristics (depth and slopes) even without pulse shaping in time domain. The second communications device 104 has to confirm its abilities to receive the dataflow without roll-off interval in its corresponding response by setting the NO_ROI interval also to "1".

If the first communications device 102 or the second communications device 104 does not support communication without roll-off interval (e.g. if backward compatibility to earlier home plug nodes or powerline communication modems shall be guaranteed) this bit shall be set to "zero" ("0") and the roll-off interval will be inserted.

Figure 4:
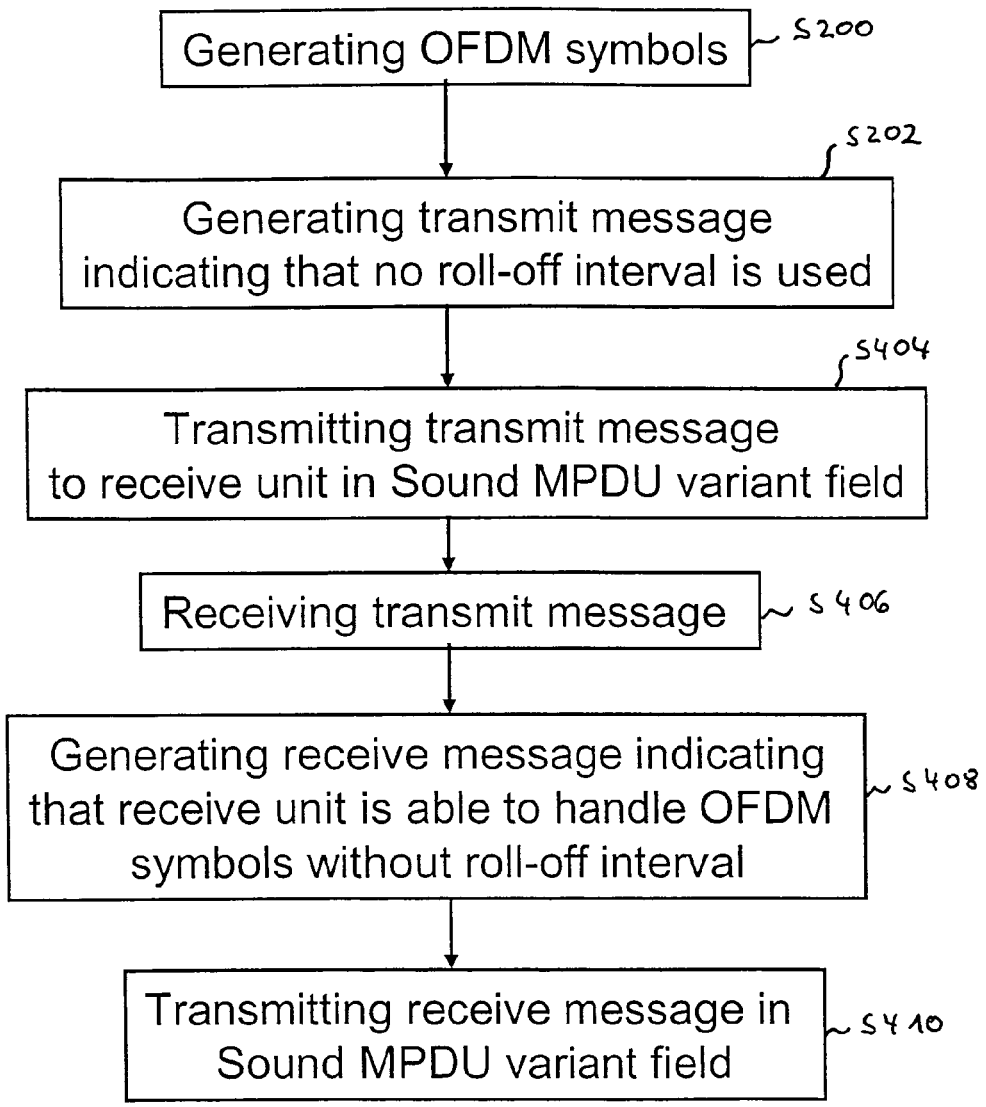
FIG. 4 shows schematically steps of a method according to an embodiment of the disclosure.

In FIG. 4 schematic block diagram of a corresponding method is depicted. In S200 OFDM symbols are generated and in S202 the transmit message indicating that no roll-off interval is used is generated. Afterwards the transmit message is transmitted to the receive unit 120 in a sound MPDU variant field in S404. After receiving the transmit message in S406 a receive message is generated indicating that the receive unit 120 is able to handle OFDM symbols without roll-off interval. In S410 the receive message is transmitted in a sound MPDU variant field from the second communications device 104 to the first communications device 102.

To ensure backward compatibility to earlier home plug modems the communication in a robust mode ("ROBO mode") or initialization mode keeps the roll-off interval. If the roll-off interval is removed 4.96 microseconds of communication resources in time domain are saved between all OFDM symbols in the dataflow.

A new North American spectrum mask if notches are implemented using digital filters is depicted in table 2 (PSD Limit: Power Spectral Density Limit).

TABLE 2

North American Carrier mask for HomePlug including notches by digital filtering

| Frequency F (MHz) | PSD Limit (dBm/Hz) | Carrier On/Off | Notes |
|---|---|---|---|
| F <= 1.71 | −87 | Carriers 0-70 are OFF | AM broadcast band and lower |
| 1.71 < F < 1.8 | −80 | Carriers 71-73 are OFF | Between AM and 160-meter band |
| 1.8 <= F <= 2.00 | −80 | Carriers 74-85 are OFF | 160 meter amateur band |
| 2.00 < F < 3.5 | −50 | Carriers 86-143 are ON | HomePlug carriers |
| 3.5 <= F <= 4.00 | −80 | Carriers 144-163 are OFF | 80 meter amateur band |
| 4.000 < F < 5.33 | −50 | Carriers 164-218 are ON | HomePlug carriers |
| 5.33 <= F <= 5.407 | −80 | Carriers 219-221 are OFF | 5 MHz amateur band |
| 5.407 < F < 7.0 | −50 | Carriers 222-286 are ON | HomePlug Carriers |
| 7.0 <= F <= 7.3 | −80 | Carriers 287-299 are OFF | 40 meter amateur band |
| 7.3 < F < 10.10 | −50 | Carriers 300-413 are ON | HomePlug carriers |
| 10.10 <= F <= 10.15 | −80 | Carriers 414-415 are OFF | 30 meter amateur band |
| 10.15 < F < 14.00 | −50 | Carriers 416-573 are ON | HomePlug carriers |
| 14.00 <= F <= 14.35 | −80 | Carriers 574-587 are OFF | 20 meter amateur band |
| 14.35 < F < 18.068 | −50 | Carriers 588-740 are ON | HomePlug carriers |
| 18.068 <= F <= 18.168 | −80 | Carriers 741-744 are OFF | 17 meter amateur band |
| 18.168 < F < 21.00 | −50 | Carriers 745-860 are ON | HomePlug carriers |
| 21.000 <= F <= 21.45 | −80 | Carriers 861-878 are OFF | 15 meter amateur band |
| 21.45 < F < 24.89 | −50 | Carriers 879-1019 are ON | HomePlug Carriers |
| 24.89 <= F <= 24.99 | −80 | Carriers 1020-1023 are OFF | 12 meter amateur band |
| 24.99 < F < 28.0 | −50 | Carriers 1024-1146 are ON | HomePlug Carriers |
| F >= 28.0 | −80 | Carriers 1147-1535 are OFF | 10 meter amateur band |

A corresponding European carrier mask might be established like as depicted in table 3.

TABLE 3

European Carrier mask for HomePlug including notches by digital filtering

| Frequency F (MHz) | PSD Limit (dBm/Hz) | Carrier On/Off | Notes |
|---|---|---|---|
| F <= 1.71 | −87 | Carriers 0-70 are OFF | AM broadcast band and lower |
| 1.71 < F < 1.8 | −80 | Carriers 71-73 are OFF | Between AM and 160-meter band |
| 1.8 <= F <= 2.00 | −80 | Carriers 74-85 are OFF | 160 meter amateur band |
| 2.00 < F < 2.85 | −50 | Carriers 86-116 are ON | HomePlug carriers |
| 2.85 <= F <= 3.025 | −80 | Carriers 117-123 are OFF | Aeronautical Mobile |
| 3.025 < F < 3.4 | −50 | Carriers 124-139 are ON | HomePlug carriers |
| 3.4 <= F <= 4.00 | −80 | Carriers 144-163 are OFF | Aeronautical Mobile + 80 meter amateur band |
| 4.000 < F < 4.65 | −50 | Carriers 164-190 are ON | HomePlug carriers |
| 4.65 <= F <= 4.7 | −80 | Carriers 191-192 are OFF | Aeronautical Mobile |
| 4.7 < F < 5.25 | −50 | Carriers 193-215 are ON | HomePlug carriers |

TABLE 3-continued

European Carrier mask for HomePlug including notches by digital filtering

| Frequency F (MHz) | PSD Limit (dBm/Hz) | Carrier On/Off | Notes |
|---|---|---|---|
| 5.25 <= F <= 5.41 | −80 | Carriers 216-221 are OFF | 5 MHz amateur band |
| 5.41 < F < 5.48 | −50 | Carriers 222-224 are ON | HomePlug Carriers |
| 5.48 <= F <= 5.68 | −80 | Carriers 225-232 are OFF | Aeronautical Mobile |
| 5.68 < F < 6.525 | −50 | Carriers 233-267 are ON | HomePlug Carriers |
| 6.525 <= F <= 6.685 | −80 | Carriers 268-273 are OFF | Aeronautical Mobile |
| 6.685 < F < 7.0 | −50 | Carriers 222-286 are ON | HomePlug Carriers |
| 7.0 <= F <= 7.3 | −80 | Carriers 287-299 are OFF | 40 meter amateur band |
| 7.3 < F < 8.815 | −50 | Carriers 300-361 are ON | HomePlug carriers |
| 8.815 <= F <= 8.965 | −80 | Carriers 362-367 are OFF | Aeronautical Mobile |
| 8.965 < F < 10.005 | −50 | Carriers 368-409 are ON | HomePlug carriers |
| 10.005 <= F <= 10.15 | −80 | Carriers 410-415 are OFF | Aeronautical Mobile + 30 meter amateur band |
| 10.15 < F < 11.275 | −50 | Carriers 416-461 are ON | HomePlug Carriers |
| 11.275 <= F <= 11.4 | −80 | Carriers 462-466 are OFF | Aeronautical Mobile |
| 11.4 < F < 13.26 | −50 | Carriers 467-543 are ON | HomePlug Carriers |
| 13.26 <= F <= 13.36 | −80 | Carriers 544-547 are OFF | Aeronautical Mobile |
| 13.36 < F < 14.00 | −50 | Carriers 548-573 are ON | HomePlug carriers |
| 14.00 <= F <= 14.35 | −80 | Carriers 574-587 are OFF | 20 meter amateur band |
| 14.35 < F < 17.9 | −50 | Carriers 588-733 are ON | HomePlug carriers |
| 17.9 <= F <= 17.97 | −80 | Carriers 734-736 are OFF | Aeronautical Mobile |
| 17.97 < F < 18.068 | −50 | Carriers 737-740 are ON | HomePlug carriers |
| 18.068 <= F <= 18.168 | −80 | Carriers 741-744 are OFF | 17 meter amateur band |
| 18.168 < F < 21.00 | −50 | Carriers 745-860 are ON | HomePlug carriers |
| 21.000 <= F <= 21.45 | −80 | Carriers 861-878 are OFF | 15 meter amateur band |
| 21.45 < F < 21.924 | −50 | Carriers 879-898 are ON | HomePlug Carriers |
| 21.924 <= F <= 22.00 | −80 | Carriers 899-901 are OFF | Aeronautical Mobile |
| 22.00 < F < 24.89 | −50 | Carriers 902-1019 are ON | HomePlug Carriers |
| 24.89 <= F <= 24.99 | −80 | Carriers 1020-1023 are OFF | 12 meter amateur band |
| 24.99 < F < 26.965 | −50 | Carriers 1024-1104 are ON | HomePlug Carriers |
| 26.965 <= F <= 29.70 | −80 | Carriers 1105-1216 are OFF | CB radio, model control, elderly alarms, 10 meter amateur band |
| 29.70 < F < 30.0 | −50 | Carriers 1217-1228 are ON | HomePlug Carriers |
| F >= 30.0 | −80 | Carriers > 1229 are OFF | |

Figure 5:
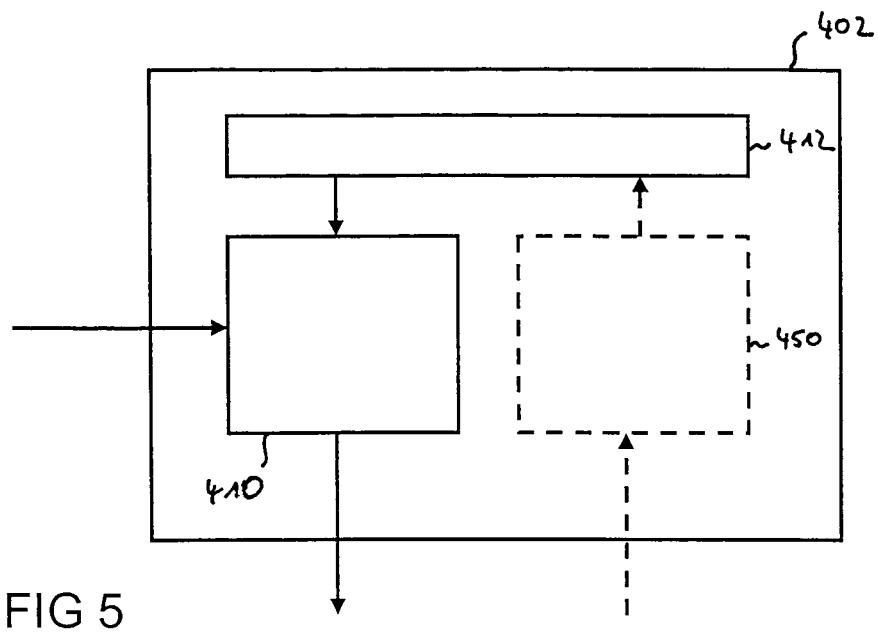
FIG. 5 shows a schematic block diagram of a first communications device including a transmit unit according to an embodiment of the disclosure.

In FIG. 5 a schematic block diagram of a first communications device 402, including a transmit unit 410 is depicted. The transmit unit 410 is adapted to generate OFDM symbols to be transmitted using sub-carriers. The first communications device 402 further includes a roll-off interval indication unit 412 adapted to generate a transmit message indicating that no roll-off interval before and/or after the OFDM symbols is used when transmitting the data.

The transmit unit 410 is further adapted to transmit the transmit message. The first communications device 402 may be an exclusively transmitting device with one or a plurality of transmit ports only. According to other embodiments, the first communication device 402 is a bidirectional device including, in addition to the transmit unit 410, a receive unit 450 adapted to receive data from a further communications device.

Figure 6:
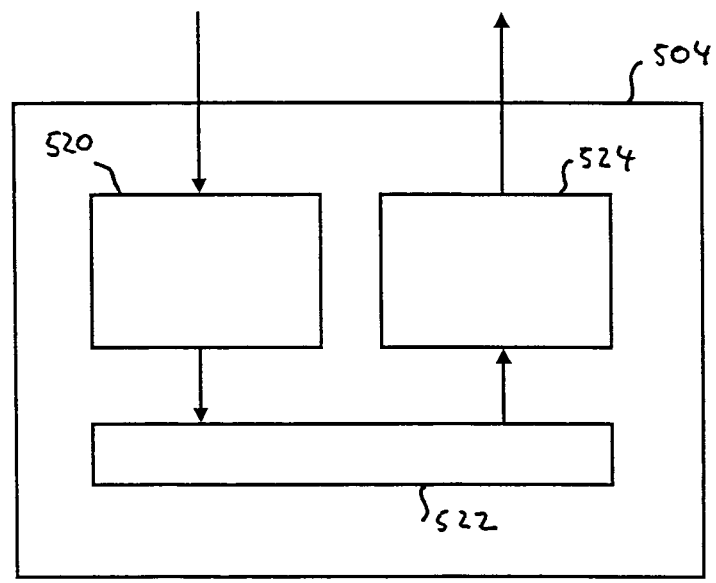
FIG. 6 shows a schematic block diagram of a second communications device including a receive unit according to a further embodiment of the disclosure.

In FIG. 6 a second communications device 504 is depicted as a schematic block diagram. The second communications device 504 includes a receive unit 520 adapted to generate the data from the transmitted OFDM symbols by taking into account a received transmit message. The second communications device 504 further includes a roll-off interval handling unit 522 adapted to generate a receive message indicating that the receive unit 120 is able to handle OFDM symbols without roll-off interval before and/or after the OFDM symbols. A further transmit unit 524 is included which is adapted to transmit the receive message to a further communications device.

The invention claimed is:

1. A system for transmitting data via a power line, comprising:
    a first communications device and a second communications device, each being configured to transmit and/or receive the data using an orthogonal frequency division multiplexing (OFDM) scheme using modulated sub-carriers superimposed on alternating current of the power line;
    the first communications device including circuitry configured to:
        generate OFDM symbols to be transmitted using the sub-carriers;
        generate a transmit message indicating that no roll-off interval before and/or after the OFDM symbols is used when transmitting the data; and
        transmit the transmit message; and
    the second communications device including circuitry configured to generate the data from the transmitted OFDM symbols by taking into account the received transmit message.

2. The system according to claim 1, wherein the first communications device circuitry is further configured to transmit the transmit message in a Sound Medium Access Control Physical Data Unit (MPDU) variant field.

3. The system according to claim 1, wherein the second communications device circuitry is further configured to:

generate a receive message indicating that the second communications device circuitry is able to handle OFDM symbols without roll-off interval before and/or after the OFDM symbols, and transmit the receive message to the first communications device.

4. The system according to claim 3, wherein the receive message is a bit and the second communications device circuitry is further configured to transmit the receive message in a sound Medium Access Control Physical Data Unit (MPDU) variant field.

5. The system according to claim 1, wherein the transmit message is a single bit.

6. The system according to claim 3, wherein the receive message is a single bit.

7. A communications device for transmitting data via a power line, comprising:

circuitry configured to:

transmit and/or receive the data using an orthogonal frequency division multiplexing (OFDM) scheme using modulated sub-carriers superimposed on alternating current of the power line;

generate OFDM symbols to be transmitted using the sub-carriers;

generate a transmit message indicating that no roll-off interval before and/or after the OFDM symbols is used when transmitting the data; and transmit the transmit message.

8. The communications device according to claim 7, wherein the circuitry is further configured to include the transmit message in a Sound Medium Access Control Physical Data Unit (MPDU) Variant field.

9. A communications device for receiving data via a power line, comprising:

circuitry configured to:

transmit and/or receive the data using an orthogonal frequency division multiplexing (OFDM) scheme using modulated sub-carriers superimposed on alternating current of the power line;

generate the data from transmitted OFDM symbols by taking into account a received transmit message;

generate a receive message indicating that the communications device is able to handle OFDM symbols without roll-off interval before and/or after the OFDM symbols; and transmit the receive message to a further communications device.

10. The communications device according to claim 9, wherein the circuitry is further configured to include the receive message in a Sound Medium Access Control Physical Data Unit (MPDU) Variant field.

11. A method for transmitting data via a power line, comprising:

transmitting, using circuitry, the data using an orthogonal frequency division multiplexing (OFDM) scheme using modulated sub-carriers superimposed on alternating current of the power line;

generating, using the circuitry, OFDM symbols to be transmitted using the sub-carriers;

generating, using the circuitry, a transmit message indicating that no roll-off interval before and/or after the OFDM symbols is used when transmitting the data; and transmitting, using the circuitry, the transmit message from a first communication device to a second communications device.

12. The method according to claim 11, wherein the transmit message is transmitted in a Sound Medium Access Control Physical Data Unit (MPDU) Variant Field.

13. The method according to claim 11, further comprising:

generating, using the circuitry, a receive message in the second communications device indicating that the circuitry is able to handle transmitted data without roll-off interval before and/or after the OFDM symbols; and transmitting, using the circuitry, the receive message from the second communications device to the first communications device.

14. The method according to claim 13, wherein the receive message is transmitted in a Sound Medium Access Control Physical Data Unit (MPDU) Variant Field.

15. The method according to claim 11, wherein a roll-off interval is used during communication between the first communications device and the second communications device in an initialization mode.

* * * * *